United States Patent
Lee et al.

(10) Patent No.: US 7,603,667 B2
(45) Date of Patent: Oct. 13, 2009

(54) MULTI-DOWNLOAD STRUCTURE AND METHOD OF MOBILE COMMUNICATION TERMINAL

(75) Inventors: Mun Ju Lee, Kyungki-Do (KR); Dong Kyun Lee, Kyungki-Do (KR); Hyung Kun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 10/078,154

(22) Filed: Feb. 20, 2002

(65) Prior Publication Data

US 2002/0162099 A1   Oct. 31, 2002

(30) Foreign Application Priority Data

Feb. 20, 2001   (KR) ................... 2001-8508

(51) Int. Cl.
*G06F 9/44* (2006.01)
*G06F 9/445* (2006.01)
*H04M 3/00* (2006.01)

(52) U.S. Cl. ............. 717/172; 717/169; 717/175; 717/177; 455/418

(58) Field of Classification Search ............. 717/178, 717/173
See application file for complete search history.

(56) References Cited

U.S. PATENT DOCUMENTS

| | | | | |
|---|---|---|---|---|
| 5,602,993 A | * | 2/1997 | Stromberg | 717/173 |
| 5,654,901 A | * | 8/1997 | Boman | 717/173 |
| 5,732,275 A | * | 3/1998 | Kullick et al. | 717/170 |
| 5,752,042 A | * | 5/1998 | Cole et al. | 717/173 |
| 5,787,288 A | * | 7/1998 | Nagata et al. | 717/173 |
| 5,870,610 A | * | 2/1999 | Beyda | 717/173 |
| 5,896,566 A | * | 4/1999 | Averbuch et al. | 455/419 |
| 5,919,247 A | * | 7/1999 | Van Hoff et al. | 709/217 |
| 5,933,647 A | * | 8/1999 | Aronberg et al. | 717/178 |
| 6,023,585 A | * | 2/2000 | Perlman et al. | 717/178 |
| 6,041,183 A | * | 3/2000 | Hayafune et al. | 717/173 |
| 6,074,434 A | * | 6/2000 | Cole et al. | 717/173 |
| 6,128,776 A | * | 10/2000 | Kang | 717/173 |
| 6,151,709 A | * | 11/2000 | Winkel | 717/173 |
| 6,167,567 A | * | 12/2000 | Chiles et al. | 717/173 |
| 6,178,468 B1 | * | 1/2001 | Rudd et al. | 717/175 |

(Continued)

OTHER PUBLICATIONS

Microsoft Press, "Computer Dictionary—Third Edition"; Microsoft Press, 1997, pp. 415, 429, 452.*

(Continued)

*Primary Examiner*—Tuan Q Dam
*Assistant Examiner*—Thuy Dao
(74) *Attorney, Agent, or Firm*—KED & Associates, LLP

(57) ABSTRACT

A multi-download structure and a method of downloading information to one or more mobile communications terminals is provided. The structure includes an input unit for inputting download terms. A user download executing unit displays the inputted download terms and model information of mounted terminals on a screen and integrally controls/manages a multi-downloading operation. A plurality of lower download executing units, in which terminal model information has been registered, individually execute download operations to each mounted terminal. A medium unit receives the download terms and the terminal model information from the user download executing unit, automatically selects a model of the terminal to be downloaded, automatically calls the plurality of lower download executing units corresponding to the selected terminal models, and executes the multi-downloading operation.

26 Claims, 9 Drawing Sheets

U.S. PATENT DOCUMENTS

| | | | |
|---|---|---|---|
| 6,269,481 B1 * | 7/2001 | Perlman et al. | 717/178 |
| 6,298,480 B1 * | 10/2001 | Beuk et al. | 717/171 |
| 6,308,061 B1 * | 10/2001 | Criss et al. | 455/418 |
| 6,308,325 B1 * | 10/2001 | Dobbek | 717/178 |
| 6,366,898 B2 * | 4/2002 | Taivalsaari et al. | 707/1 |
| 6,496,979 B1 * | 12/2002 | Chen et al. | 717/178 |
| 6,594,737 B2 * | 7/2003 | Niwa et al. | 711/154 |
| 6,668,374 B1 * | 12/2003 | Sten et al. | 717/173 |
| 6,751,794 B1 * | 6/2004 | McCaleb et al. | 717/168 |
| 2002/0073415 A1 * | 6/2002 | Kim et al. | 717/173 |
| 2002/0188934 A1 * | 12/2002 | Griffioen et al. | 717/170 |
| 2003/0033525 A1 * | 2/2003 | Rajaram | 713/168 |
| 2004/0158829 A1 * | 8/2004 | Beresin et al. | 717/178 |

OTHER PUBLICATIONS

"Client-server computing in mobile environments", Jing et al., Jun. 1999, pp. 117-157. Online retrieved at <http://portal.acm.org/citation.cfm?id=319806.319814>.*

"Optimal access point placement in simultaneous broadcast system using OFDM for indoor wireless LAN", Kobayashi et al., Dec. 2000, pp. 200-204. Online retrieved at <http://ieeexplore.ieee.org/stamp.jsp?tp=&arnumber=881418>.*

"Emerging mobile and wireless networks", Varshney et al., Jun. 2000, pp. 390-415. Online retrieved at <http://delivery.acm.org/10.1145/340000/336478/p73-varshney.pdf>.*

* cited by examiner

DOMESTIC C/S USE

OVERSEAS C/S USE

PRODUCTION USE

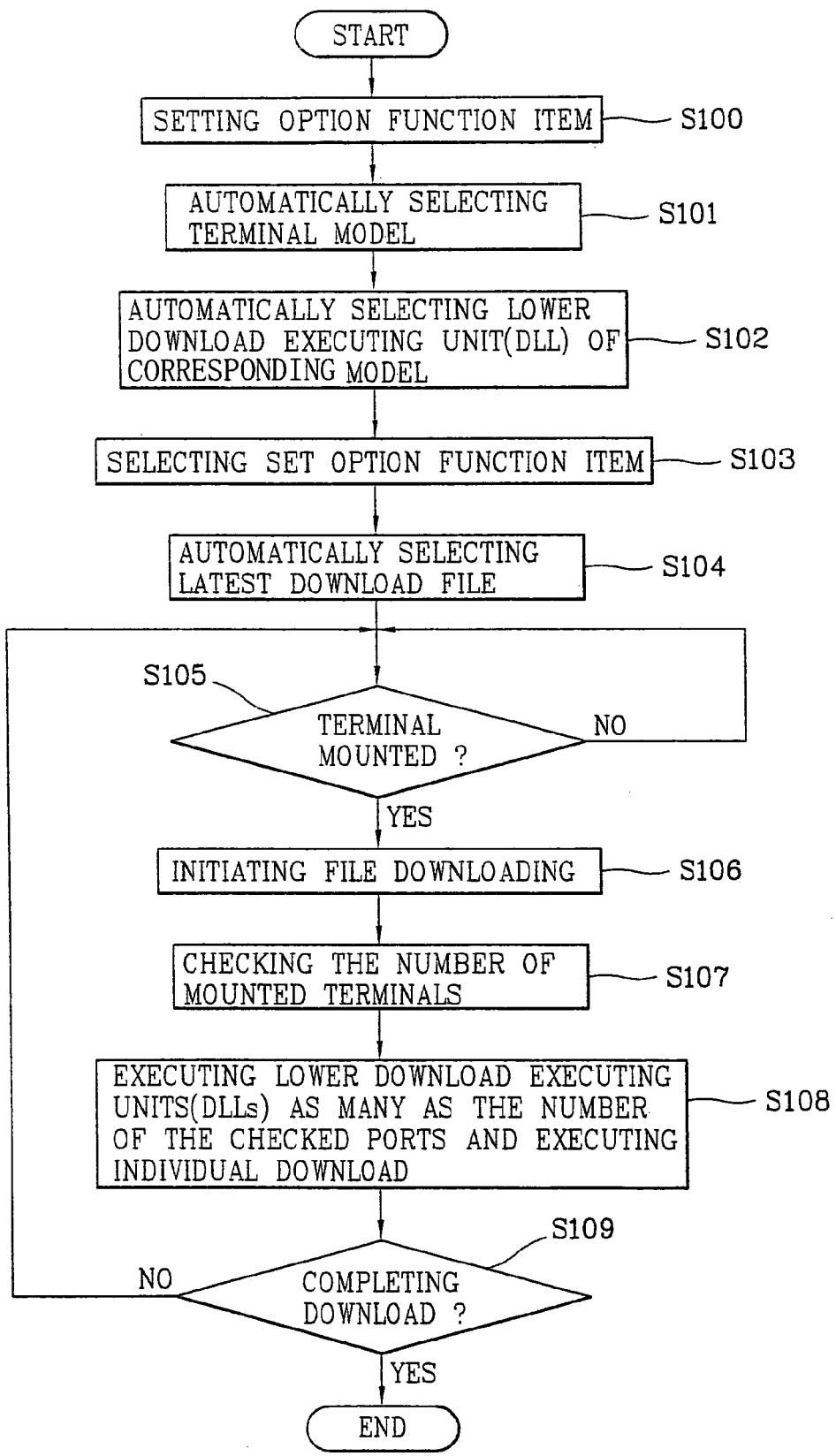

MULTI-DOWNLOAD STRUCTURE AND METHOD OF MOBILE COMMUNICATION TERMINAL

BACKGROUND OF THE INVENTION

1. Field of the Invention

The present invention relates to a mobile communications terminal and, more particularly, to a multi-download structure and methods of downloading information to mobile communications terminals.

2. Background of the Related Art

When a mobile communications terminal such as a cellular telephone is first put into service, a variety of information is downloaded into the telephone prior to delivering it to a customer. Some of the information, such as operating software, is downloaded at the manufacturing facility. Other information, such as information specific to the area in which the telephone will be used, is downloaded at a customer service center where the telephone is being sold.

FIG. 1 illustrates an overall downloading structure of a mobile communications terminal (referred to as a 'terminal', hereinafter) in accordance with the background art. The hardware structure used for a downloading operation of the background art has only one terminal 20 connected to one personal computer 10, due to the stability limitations of a download program. The terminal 20 is connected to a line trans 30 through a curl code cable, and the line trans 30 is connected to a serial port of the personal computer 10 through an RS-232C cable.

To download information from the personal computer 10 to the terminal 20, a downloading program is prepared for each terminal model. Or, alternatively, one download executing means (a user download executing program) checks a version of the connected terminal and then executes the downloading. The downloading operation will now be explained with reference to the accompanying drawings.

A user turns on the power of personal computer 10 and power supply unit 40 to display a main screen of a download executing means. When a download start button is selected on the main screen by the user, as shown in FIG. 2, the download executing means checks a serial port of personal computer 10 that is connected to terminal 20. This serial port is checked in accordance with a timer (step S1). Then, the download executing means reads a version identifier of the terminal to recognize the model of the terminal (step S2). After the model is identified, the download executing means performs two or three downloading operations using a thread method (step S3). For example, these downloading operations may include a binary (BIN) download, a script (SCR) download, a preferred roaming list (PRL) download, and a personal information memory (PIM) download.

As shown in FIG. 3, user data is first read before the download operation is executed (step S10). After the download execution is set (step S20), an execution software (SW) of terminal 20 is deleted (step S30), and a new execution SW for terminal 20 is stored (step S40). After the new execution SW is completely stored, the previously read user data is re-written into terminal 20 (step S50).

Notably, in some background art download software structures, a separate download executing means (program) is created for each terminal model. Alternatively, one downloading executing means (program) capable of interacting with multiple terminal models is created, and this download executing means performs a version check of the terminal to determine how to interact with the terminal.

Accordingly, the download executing means is specifically developed for a distribution place. If the download executing means makes a mistake in identifying a version of the terminal, the downloading operation is inevitably faulty.

In addition, since an abbreviated icon provided on the main screen of the download executing means is fixedly set, it is impossible to set a desired item through an external download term input unit.

Moreover, when downloading is executed, only a single port is supported by the downloading execution means for downloading information to terminal 20. Thereby, productivity and working efficiency of the terminal are degraded. Since the download executing means executes two or three download programs using the thread method, the download executing means is overloaded.

SUMMARY OF THE INVENTION

An object of the invention is to solve at least the above problems and/or disadvantages and to provide at least the advantages described hereinafter.

Another object of the present invention is to provide a multi-download structure and method that are capable of executing a multi-port downloading operation, by connecting a plurality of terminals to one personal computer.

Another object of the present invention is to provide a multi-download structure and method that are capable of reducing a load, to a download executing means, while downloading.

Still another object of the present invention is to provide a multi-download structure and method that are capable of setting an abbreviated icon of the download executing means through an external management program.

Yet another object of the present invention is to provide a multi-download structure and method that are capable of performing a downloading operation with only one download executing means and without developing an additional program based on a distribution place.

A further object of the present invention is to provide a multi-download structure capable of supporting a multi-port, by differentiating the download executing means into one for a production user and another for a service user.

To achieve at least the above objects in whole or in part, a multi-download structure of a mobile communications terminal embodying the invention is configured to download information to multiple communications terminals simultaneously. A multi-download device embodying the invention includes an input unit for inputting download terms; a user download executing unit; a plurality of lower download executing units; and a medium unit. The user download executing unit is for displaying the inputted download terms and model information of the mounted terminal on a screen and integrally controlling/managing a multi-downloading operation. The plurality of lower download executing units, in which terminal model information has been registered, are for individually executing a download to each terminal. The medium unit is for receiving the download terms and the terminal model information from the user download executing unit, automatically selecting a model of a terminal to be downloaded, automatically calling the plurality of lower download executing units corresponding to the selected terminal model, and executing a multi-downloading operation.

A method embodying the invention includes the steps of displaying download terms and terminal model information to be downloaded on a main screen of a download executing means; outputting the inputted download terms and the terminal model information to a medium means; selecting a lower download executing unit and the latest file for individually executing a download to a specific terminal model, by referring to the received download terms and the terminal model information; and checking the number of mounted terminals and simultaneously executing a plurality of lower download executing units, equal in number to the number of terminals, thereby performing a multi-downloading operation.

Another method embodying the invention includes the steps of: determining the number of terminals communicatively connected to a file server; and executing a plurality of downloads, equal in number to the number of connected terminals, with the file server. A plurality of lower download executing units download information stored by the file server to corresponding connected terminals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, and wherein:

FIG. 9 illustrates a flow chart of a multi-download method of a mobile communications terminal, in accordance a the preferred embodiment of the present invention.

DETAILED DESCRIPTION OF PREFERRED EMBODIMENTS

Figure 4:
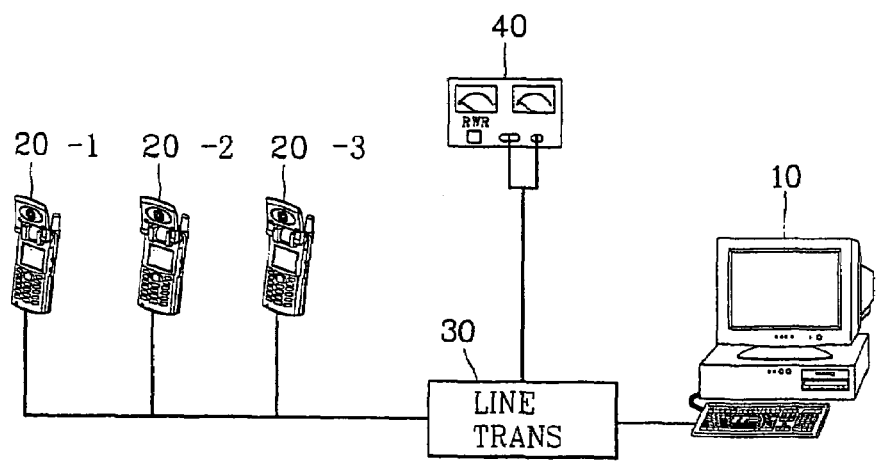
FIG. 4 illustrates an overall download structure used with multiple mobile communications terminals, in accordance with a preferred embodiment of the present invention.

FIG. 4 illustrates an overall download structure capable of sending information to multiple mobile communications terminals in accordance with a preferred embodiment of the present invention. A plurality of terminals 20-1~20-3 are connected to a personal computer 10 through line trans 30. A multi-download operation is performed through a download program running on the personal computer 10.

Figure 5:
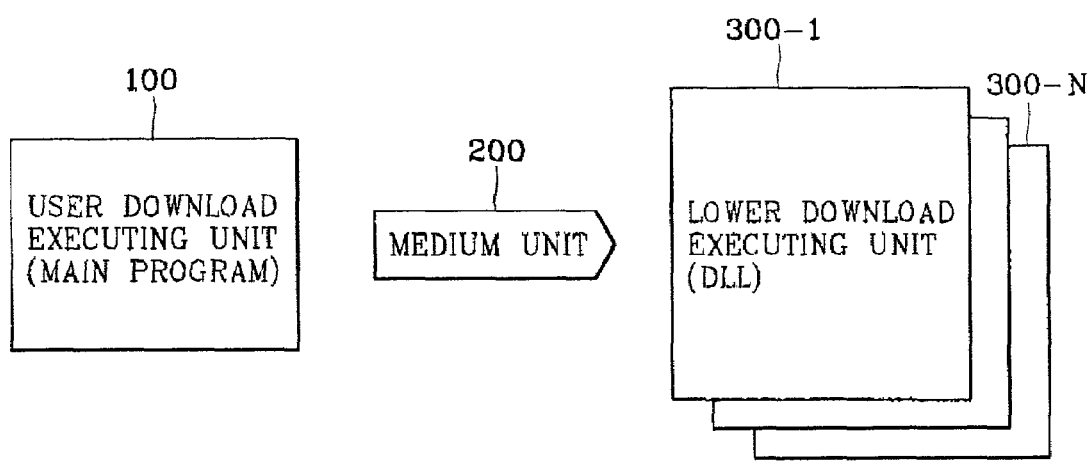
FIG. 5 illustrates a detailed download structure used with multiple mobile communications terminals, in accordance with a preferred embodiment of the present invention.

As shown in FIG. 5, a download structure for executing the multi-downloading of the present invention includes a user download executing unit 100 for controlling/managing a multi-downloading operation. A plurality of lower download executing units 300-1~300-N each execute an individual downloading operation to mounted terminals 20-1~20-3. A medium unit 200 is used to concurrently control each of the lower download executing units 300-1~300-N. The medium unit 200 controls a number of lower download executing units 300-1~300-N, which number is equal to the number of mounted terminals 20-1~20-3, and performs a multi-downloading operation on the basis of the download terms and the terminal model information provided by the user download executing unit 100.

The user download executing unit 100 is implemented by the user download executing program (a main program), and the lower download executing units 300-1~300-N are implemented by a lower executing program (DLL: Dynamic Link Library). The medium unit 200 is implemented by a medium program to perform a multi-downloading operation by receiving the download terms and the terminal model information from the user download executing unit 100. Alternatively, the medium program may receive terminal model information from the lower download execution units that are connected to the units themselves. The medium program also controls the lower download executing units 300-1~300-N. The user download executing unit 100 is a program for integrally managing a multi-download operation. A main screen like the one shown in FIG. 6 can be used by an operator to control the user download executing unit 100.

Figure 6:
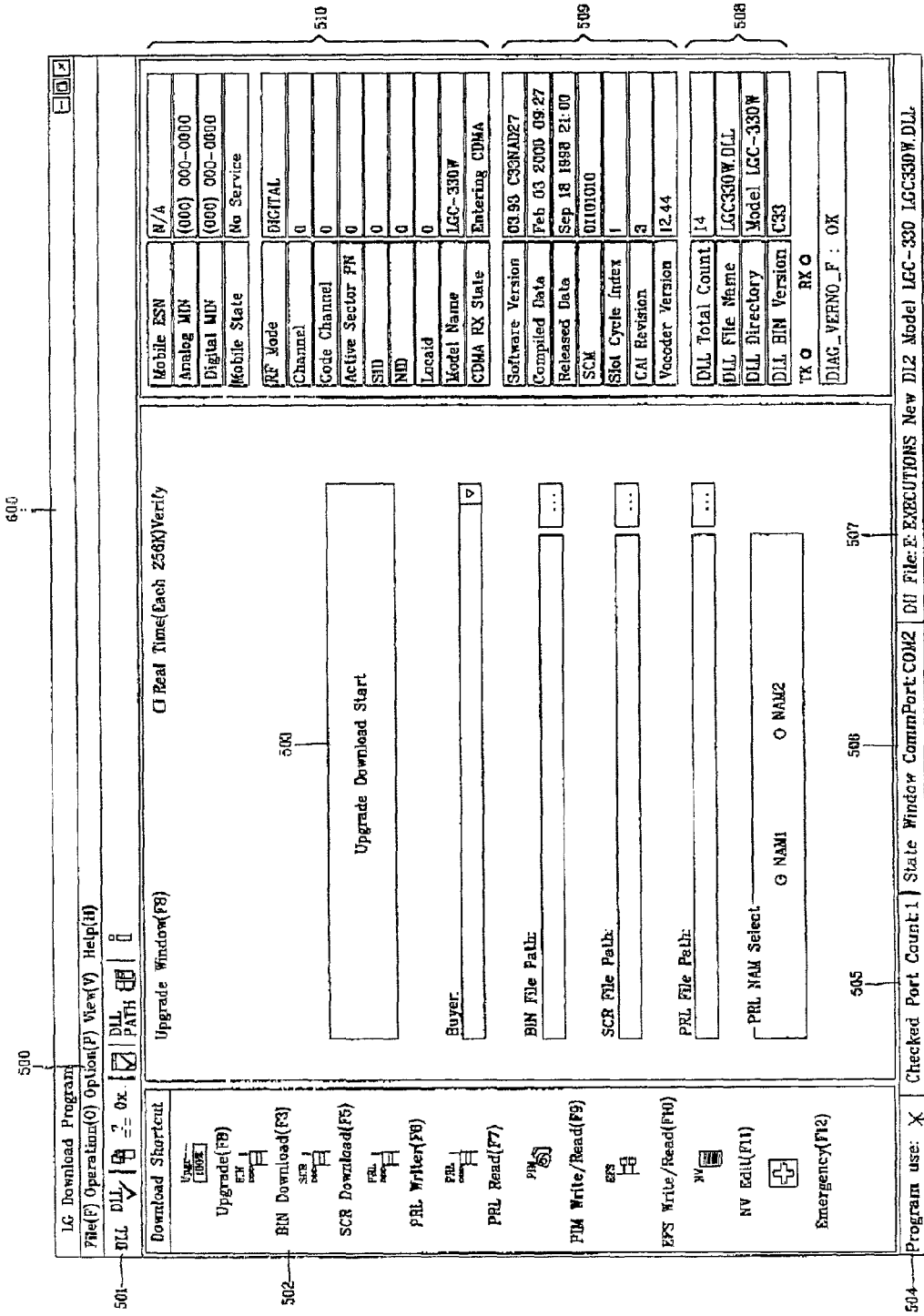
FIG. 6 illustrates a main screen of the user download executing unit shown in FIG. 5, in accordance with a preferred embodiment of the present invention.

As shown in FIG. 6, main screen 600 of the user download executing unit 100 includes a plurality of menu bars and status bars. The menu bars include a tool bar 500, an option item bar 501, an abbreviated icon bar 502, and a download start button 503. The status bars include a download program use place bar 504, a bar 505 identifying the number of ports connected to terminals 20-1~20-3, a reference serial port bar 506, a DLL path bar 507, DLL information bars 508, download history information bars 509, and terminal information bars 510.

Figure 7:
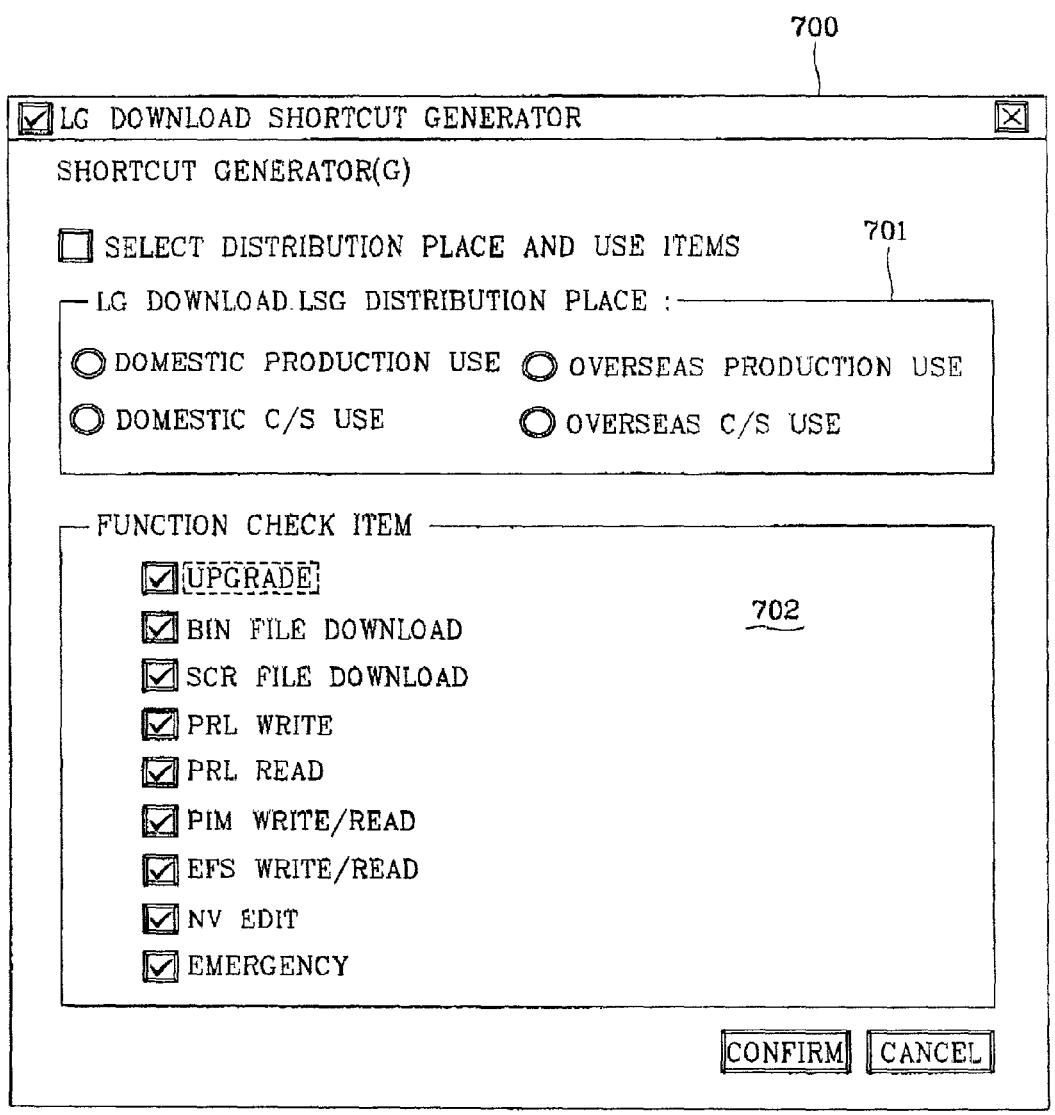
FIG. 7 illustrates a sub-screen for setting the terminal distribution place shown in FIG. 6, in accordance with a preferred embodiment of the present invention.

Option item 501, of the user download executing unit 100, is used for setting the download term, that is, the abbreviated icon 502, the download program user place 504, and the number of ports (single or multi-port) 505. When option item 501 is selected by the user, a shortcut generator sub-screen 700 for setting the terminal distribution place is displayed as a separate window, as shown by FIG. 7. The shortcut generator 700 is a program for easily performing a selected function in response to a request of a manufacturer or a purchaser. A distribution department (manufacturing technique, C/S support) may select a corresponding function to adopt, distribute, or manage the option file.

Referring now to FIG. 7, the distribution place 701 is classified into a domestic production use, an overseas production use, a domestic C/S use, and an overseas C/S use. The function check item 702 is classified into a binary (BIN) download, a script (SCR) download, a preferred roaming list (PRL) download, a personal information memory (PIM) download, an embedded file system (BPS) download, a non-volatile (NV) edit download, and an emergency download. Accordingly, when a distribution place 701 and a function check item 702 are selected by the user, abbreviated icons 502 indicating a file to be downloaded are generated and a user place 504 of the download program is set on main screen 600.

Figure 8A:
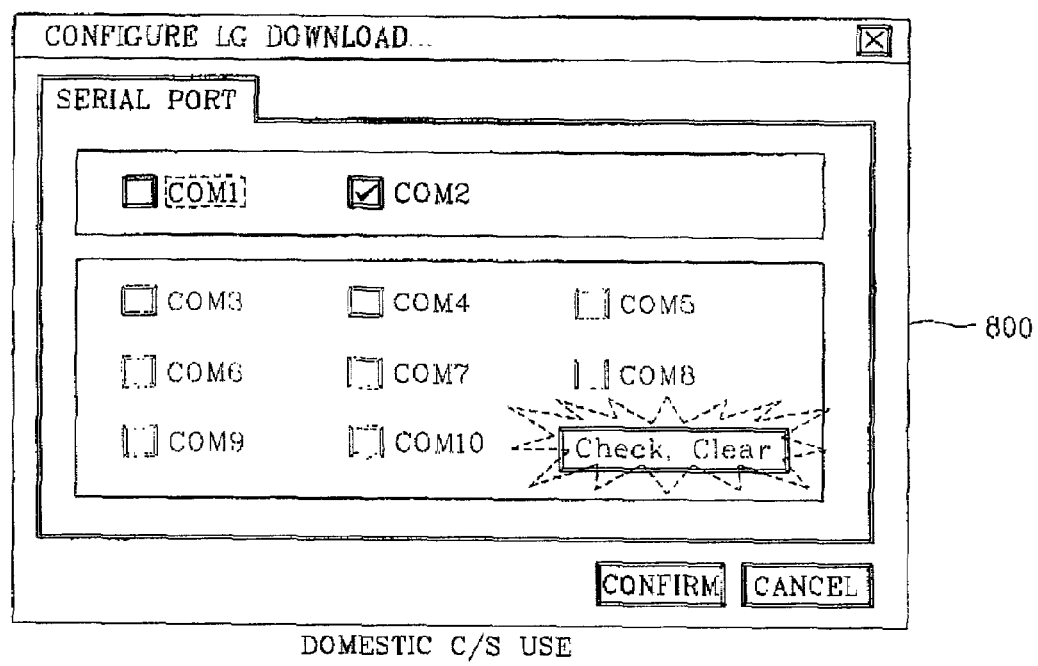
FIGS. 8A, 8B and 8C illustrate sub-screens for setting a serial port of a personal computer communicating with the terminal shown in FIG. 6.
Figure 8B:
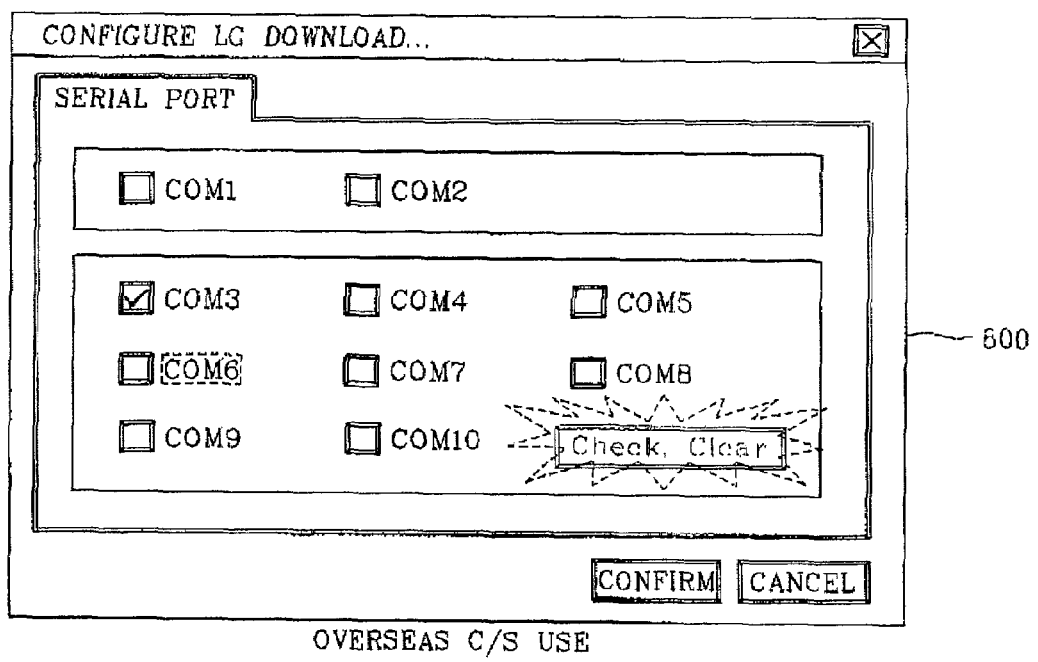
Figure 8C:
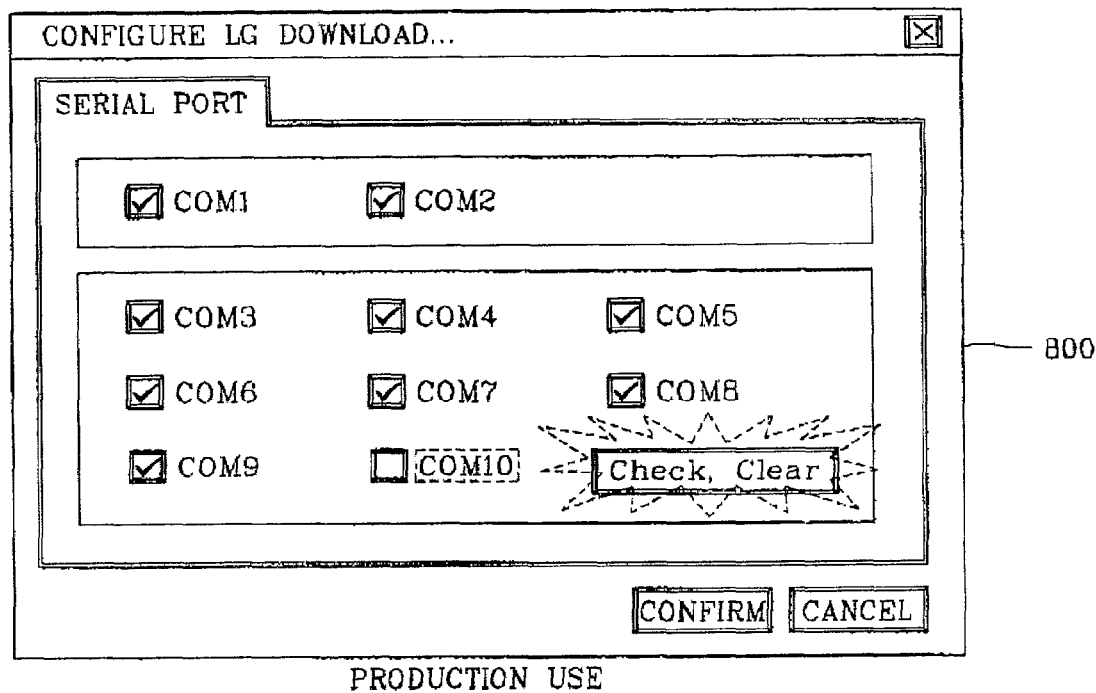

As shown in FIGS. 8A through 8C, the serial ports of personal computer 10 that are to communicate with terminals 20-1~20-3 can be set using an option of the distribution place 701, by means of short-cut generator 700. That is, with reference to FIG. 7, when the menu items for the C/S user and production user are optionally selected, a sub-screen 800 for selecting a communications port, as shown in FIGS. 8A through 8C, is displayed in a separate window. In the illustrated examples, the domestic C/S use and the overseas C/S use are set to single port (FIGS. 8A and 8B, respectively), while the domestic and the overseas production use are set to multi-port (FIG. 8C). Accordingly, when the user sets the multi-port option, a status bar 505 indicating the number of ports (i.e., three ports) is displayed at the lower-end portion of main screen 600.

The plurality of lower download executing units (DLL) 300-1~300-N are programs that substantially execute a downloading operation, in which model information of terminals 20-1~20-3 has been registered. Medium unit 200 is a program for comparing the model information read by the lower download executing units 300-1~300-N and the terminal model information provided by user download executing unit 100. This program automatically calls the lower download executing units 300-1~300-N, in which the model information of terminals 20-1~20-3 mounted in the current download structure has been registered, to thereby execute a multi-downloading operation.

The multi-downloading operation of the mobile communication terminal will now be described with reference to FIG. 9. After turning on the power to personal computer 10 and power supply unit 40, the user selects menu bar 501 on main screen 600 of the user download executing unit 100, shown in FIG. 6. In step 100, as menu bar 501 is selected, sub-menu 700 of FIG. 7 is displayed, and the user selects a distribution place 701 on the sub-menu. The selected distribution place 701 corresponds to a group of prescribed abbreviated icons that will be displayed in menu bar 502. Additionally, the selected distribution place 701 corresponds to and identifies the reference serial ports 506 connected to terminals 20-1~20-3.

Thereafter, the user selects the download start button 503 to initiate a downloading operation to terminals 20-1~20-3. When the downloading operation is initiated, the user download executing unit 100 only outputs the item information and model information of each terminal 20-1~20-3 to medium unit 200, without being involved in the actual downloading operation.

As shown in FIG. 9, in step 101 the medium unit 200 automatically determines the model of terminals 20-1~20-3 by the item information provided from the user download executing unit 100. Thereafter, medium unit 200 reads terminal model information from each of the lower download executing units 300-1~300-N and automatically calls the lower download executing units 300-1~300-N having the same model information registered as that of terminals 20-1~20-3, mounted in the current download structure (step S102).

After the function items (i.e., the abbreviated icons 502, the download program user place 504, and the reference serial port 506) are set by the user, the latest files are automatically selected (steps S103 and S104). That is, the latest versions of the corresponding files are automatically selected among the BIN file, the SCR file, the PRL file, the PIM file, the EFS file, the NV Edit file and the emergency file.

After the latest files are selected, in step 105 the medium unit 200 checks whether terminals 20-1~20-3 have been mounted for a current downloading operation. If terminals 20-1~20-3 have been mounted, in steps 106 and 107 the medium unit 200 identifies the reference serial port to determine the number of terminals 20-1~20-3 (i.e., three) connected (activated) to the corresponding serial ports. Then, in step 108 the medium unit 200 assigns a number of lower download executing units (DLL) 300-1~300-N, which number is equal to the corresponding number of ports having mounted terminals 20-1~20-3, to individually perform a downloading operation.

Thereafter, when the downloading operation is completed, every executed procedure is terminated. If, however, the downloading operation has not been completed, medium unit 200 returns to step 105 to perform a downloading operation for a different terminal.

Figure 1:
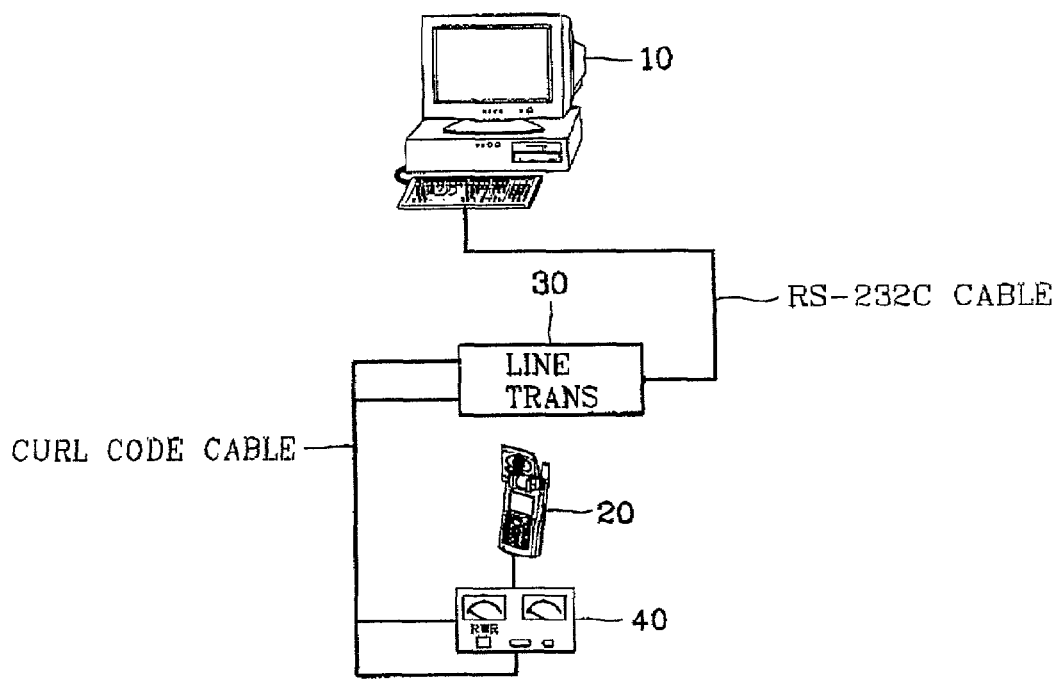
FIG. 1 illustrates an overall download structure used with a mobile communications terminal, in accordance with a background art.
Figure 2:
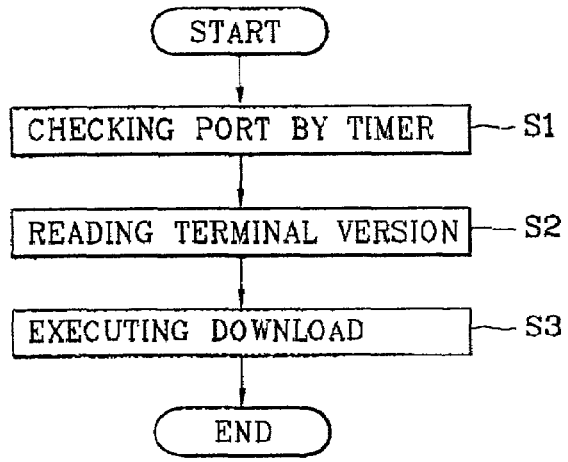
FIG. 2 illustrates a flow chart of a downloading method of the mobile communication terminal of FIG. 1, in accordance with the background art.
Figure 3:
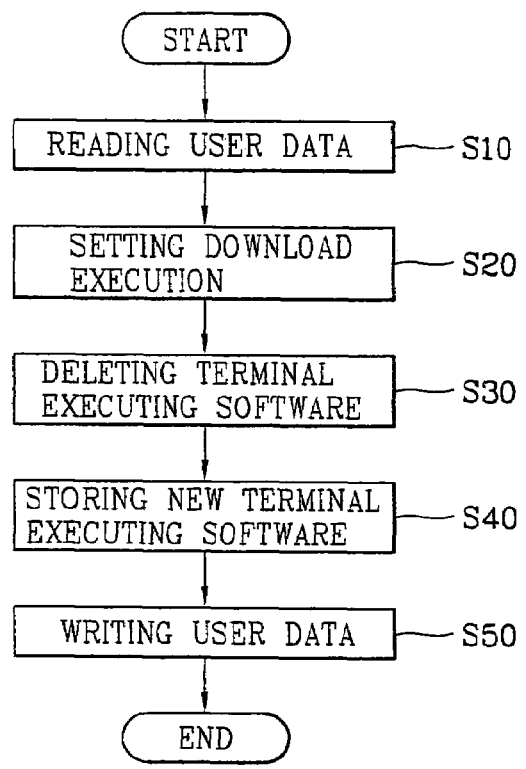
FIG. 3 illustrates a detailed flow chart of the downloading operation of FIG. 2, in accordance with the background art.
Figure 10:
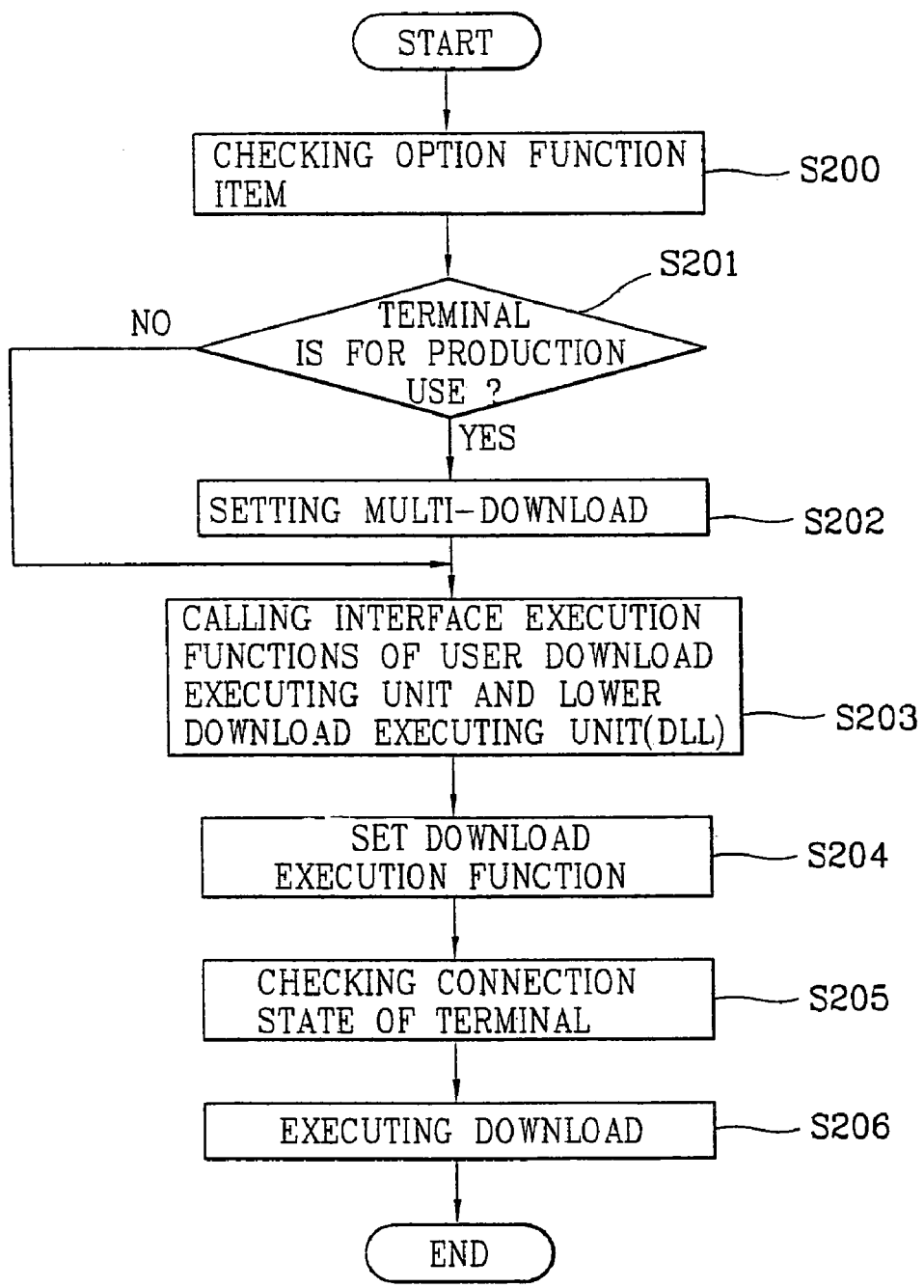
FIG. 10 illustrates a flow chart of an individual download operation in accordance with a preferred embodiment of the present invention.

FIG. 10 is a flow chart illustrating an individual downloading operation of step 108 shown in FIG. 9. In steps 200 and 201, the medium unit 200 checks the terminal distribution place 504, identified on main screen 600 of the user download executing unit 100 to determine whether the downloading terminal is assigned to a production use or a C/S use. If the distribution place is identified for production use, medium unit 200 sets the multi-download operation in step S202, and calls interface (I/F) execution functions of the user download executing unit 100 and the lower download executing units 300-1~300-N in step 203. In step 204, the medium unit 200 sets a download execution function. If, however, the distribution place is identified for Customer Service use, the multi-download setting step (step 202) is omitted. After the download execution function is set, in steps 205 and 206 the medium unit 200 program checks the connection state of terminals 20-1~20-3 and calls the lower download executing units (DLL) 300-1~300-N to perform the downloading operation. The lower download executing units (DLL) 300-1~300-N perform the same downloading operation as that of the background art, as shown in FIG. 2.

Since the multi-download structure is implemented with one user download executing unit 100 (the main program) and the plurality of lower download executing units 300-1~300-N (the lower executing program), a version error, which may occur in the background art, is prevented from occurring and the time required for downloading can be considerably reduced.

Table 1 shows the comparative time required for downloading, according to the downloading methods of the present invention and the background art.

TABLE 1

| Classification | CPU | Memory | OS | Total necessary time (9 terminals) |
| --- | --- | --- | --- | --- |
| Background art | PIII 450 MHz | 128 MB | Windows 98 | About 60 minutes (6 min. 40 seconds × 9) |
| Present invention | PIII 800 MHz | 128 MB | Windows 2000 | About 7 minutes and 50 seconds |

As shown in Table 1, the time required for a downloading operation using the present invention is reduced to about 1/10 of that required by the background art.

In addition, the download structure and method of the present invention can be adopted to every field, which may require a downloading operation, without being limited to downloading information to a mobile communications terminal. For example, the download structure and method can be usefully adapted to a re-programming operations of a flash memory.

A multi-download structure and method of the present invention has many advantages. For example, because a structure including one user download executing unit 100 (the main program) and the plurality of lower download executing units 300-1~300-N (the lower execution program) corresponding to specific terminal models is adopted, a download error due to an incorrect software version, as generated in the background art, can be prevented.

Secondly, medium unit 200 containing the medium program is installed between the user download executing unit 100 and the plurality of lower download executing units 300-1~300-N. The model information registered in the lower download executing units 300-1~300-N and the model information of the terminal, provided by the user download executing unit 100, are compared by the medium unit, which automatically calls the lower download executing units 300-1~300-N. Accordingly, the user download executing unit 100 performs only the integral management operations of downloading, and the actual downloading operations performed in the lower download executing units 300-1~300-N is controlled by the medium unit 200. Therefore, in downloading, the load on the user executing program can be greatly reduced.

Thirdly, the number of terminals 20-1~20-3 connected to the serial ports, by means of medium unit 200, is equal to the number of lower download executing units 300-1~300-N, so that a downloading operation to the plurality of terminals is concurrently performed and, thus, the productivity and working efficiency can be heightened.

Fourthly, because the individual downloading operations are performed by the independent lower download executing units 300-1~300-N, even if an error occurs in the course of downloading, the downloading operation fails only at the lower download executing unit where the error occurs, while the remaining lower download executing units stably perform their own downloading operations. Thus, the downloading operation can be more stably performed.

Lastly, the abbreviated icon of the user download executing unit 100 can be set through an external management program and can be classified into a production use or a service use, to support the multi-port downloading operation.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of simultaneously performing downloading operations from a computer to a plurality of mobile terminals, the method comprising:

inputting download terms for the plurality of mobile terminals with a download executing unit;

outputting the input download terms from the download executing unit to a single medium unit coupled to a plurality of lower download executing units;

selecting latest versions of files to be downloaded to each of the plurality of mobile terminals based on the input download terms; and simultaneously executing the downloading operations using the plurality of lower download executing units of the computer connected to the single medium unit, each of the plurality lower download executing units being connected to a separate one of the plurality of mobile terminals, to download the selected files to the plurality of mobile terminals, wherein the selecting comprises:

determining a model type of each of the plurality of mobile terminals by the single medium unit obtaining model type information from each of the plurality of mobile terminals via the plurality of lower download executing units, and selecting latest versions of files to be downloaded according to the determined model types, wherein information is simultaneously downloaded from the single medium unit by each of said plurality of lower download executing units of the computer to each of the associated connected mobile terminals without the download executing unit being involved in the simultaneous downloading of the information, and wherein a downloading error only affects the downloading of a specific lower download executing unit where the downloading error occurs, wherein the download executing unit is implemented by a program within the computer and the lower download executing units are implemented by another program within the computer, and wherein the download executing unit displays, on the screen, information regarding a number of ports of the computer connected to the plurality of mobile terminals.

2. The method of claim 1, wherein the download terms input with the download executing unit identify at least one of a type of a file to be downloaded, a distribution place of the download executing unit, and number of ports of the computer to which the plurality of mobile terminals are connected.

3. The method of claim 2, wherein at least one of the download terms is set through a sub-routine that is called when a user selects an option of the download executing unit.

4. The method of claim 1, wherein the inputting the download terms comprises inputting model type information for at least one of the plurality of mobile terminals, and wherein the determining the model type comprises receiving model type information from the download executing unit as part of the download terms.

5. The method of claim 1, further comprising checking a connection state of each of the plurality of mobile terminals, and wherein the executing the downloading operations comprises simultaneously executing the downloading operations to only the mobile terminals that are properly connected to one of the plurality of lower download executing units of the computer.

6. The method of claim 1, further comprising the computer displaying a plurality of menu bars and a plurality of status bars regarding the downloading operations to the plurality of mobile terminals.

7. The method of claim 1, wherein the program that implements the lower download executing units is a Dynamic Link Library.

8. An apparatus to perform simultaneous downloading operations to a plurality of mobile terminals, comprising:

an input unit configured to input download terms;

a download executing unit configured to display the input download terms on a screen and to control the simultaneous downloading operations to the plurality of mobile terminals;

a plurality of lower download executing units, each configured to execute a corresponding one of the simultaneous download operations to a separate one of the plurality of mobile terminals; and a single medium unit coupled to the download executing unit to receive the download terms from the download executing unit, and the single medium unit coupled to each of the lower download executing units, the single medium unit to automatically determine a model identifier for each of the plurality of mobile terminals connected to corresponding ones of the lower download executing units based on terminal model information received from the lower download executing units, and the single medium unit to execute the simultaneous downloading operations to the plurality of mobile terminals based on the determined model identifier for each of the plurality of mobile terminals, wherein the single medium unit receives model information about the plurality of mobile terminals connected to the plurality of lower download executing units, wherein information is simultaneously downloaded from the single medium unit by each of said plurality of lower download executing units and is provided to each of the associated connected mobile terminals without the download executing unit being involved in the simultaneous downloading of the information from the single medium unit, and wherein the download executing unit is implemented by a program within a computer and the lower download executing units are implemented by another program within the computer, and wherein the download executing unit displays, on the screen, information regarding a number of ports of the computer connected to the plurality of mobile terminals.

9. The apparatus of claim 8, wherein the download terms displayed on the screen of the download executing unit comprise at least one of a type of a file to be downloaded, a distribution place of the download executing unit, and the number of ports of the computer having mounted mobile terminals.

10. The apparatus of claim 8, wherein the input unit comprises a unit that allows a user to set a type of a file to be downloaded.

11. The apparatus of claim 8, wherein the input unit comprises:
 a first unit that allows a user to select a location type; and
 a second unit that identifies at least one serial port of the apparatus through which files are to be downloaded to at least one of the mobile terminals.

12. The apparatus of claim 8, wherein the input unit comprises a program subroutine that is called when a user selects an option function item provided in the download executing unit.

13. The apparatus of claim 8, wherein the download executing unit communicates the download terms inputted via the input unit to the single medium unit couple to each of the lower download executing units when the simultaneous downloading operations are initiated.

14. The apparatus of claim 8, wherein the download terms inputted via the input unit include a model type of the mobile terminal connected to one of the plurality of lower download executing units.

15. The apparatus of claim 14, wherein the download executing unit communicates at least one terminal model type to the single medium unit coupled to each of the lower download executing units when the simultaneous downloading operations are initiated.

16. The apparatus of claim 8, wherein the single medium unit selects a latest version of a file to be downloaded from the computer to a specific mobile terminal based on a type of a file to be downloaded that are identified within the download terms, and wherein the single medium unit automatically causes the lower download executing the mobile terminal.

17. The apparatus of claim 8, wherein the single medium unit selects latest versions of individual files to be downloaded from the computer to a plurality of mobile terminals based on types of files to be downloaded that are identified within the download terms, and wherein the single medium unit automatically causes the plurality of lower download executing units connected to respective ones of the plurality of mobile terminals to download the respective latest files from the computer to their corresponding terminals.

18. The apparatus of claim 8, wherein the computer to display a plurality of menu bars and a plurality of status bars regarding the downloading operations to the plurality of mobile terminals.

19. The apparatus of claim 8, wherein the program that implements the lower download executing units is a Dynamic Link Library.

20. A downloading method comprising:
 determining a number of mobile terminals communicatively connected to a file server through a corresponding number of a plurality of lower download executing units;
 displaying, on a screen of a computer, a number of ports of the computer connected to the mobile terminals; and
 executing concurrently a plurality of downloading operations equal in number to the number of connected mobile terminals, wherein each of the plurality of downloading operations comprises downloading information stored by the file server to a connected mobile terminal through a corresponding lower download executing unit, and wherein the downloading information is different for at least two of the plurality of mobile terminals, wherein the downloading information is concurrently downloaded from a single intermediate downloading unit by each of said plurality of lower download executing units to each associated connected mobile terminal without a download executing unit being involved in the downloading operations, and the concurrently downloading information for the at least two mobile terminals is based on information of different models of the mobile terminals received at the single intermediate downloading unit from two of the lower download executing units, the single intermediate downloading unit coupled to each of the lower download executing units, and wherein a downloading error only affects the downloading operation of a specific lower download executing unit where the downloading error occurs, and wherein the download executing unit displays, on the screen, information regarding a number of ports of the computer connected to the mobile terminals, wherein the download executing unit is implemented by a program within the computer and the lower download executing units are implemented by another program within the computer.

21. The downloading method of claim 20, wherein the executing comprises:
 communicating user provided information from the download executing unit to the single intermediate downloading unit;
 determining, with the single intermediate downloading unit, a model type for each of the plurality of mobile terminals; and downloading the information to each of the plurality of mobile terminals based, at least in part, on the determined model types.

22. The downloading method of claim 21, wherein the downloading comprises automatically selecting a latest version of a file to be downloaded to each of he plurality of mobile terminals, with the single intermediate downloading unit, based on the determined model types.

23. The downloading method of claim 21, wherein the determining comprises communicating mobile terminal model type information from the plurality of lower download executing units to the single intermediate downloading unit.

24. The downloading method of claim 21, wherein the determining comprises receiving user input information regarding the mobile terminal model types from the download executing unit.

25. The downloading method of claim 21, further comprising the computer displaying a plurality of menu bars and a plurality of status bars regarding the downloading operations to the plurality of mobile terminals.

26. The downloading method of claim 21, wherein the program that implements the lower download executing units is a Dynamic Link Library.

* * * * *